United States Patent [19]

Hotea et al.

[11] Patent Number: 5,771,151

[45] Date of Patent: Jun. 23, 1998

[54] CENTRAL ELECTRICAL ASSEMBLY

[75] Inventors: Gheorghe Hotea, Griesheim; Martin Listing, Dreieich; Josef Woller, Griesheim, all of Germany

[73] Assignee: The Whitaker Corporation, Wilmington, Del.

[21] Appl. No.: 874,488

[22] Filed: Jun. 13, 1997

[30]     Foreign Application Priority Data

Jul. 10, 1996 [EP] European Pat. Off. .............. 96111092

[51] Int. Cl.$^6$ ......................... H01R 13/68; H01R 13/207
[52] U.S. Cl. ......................... 361/626; 361/630; 361/642; 361/646; 361/729; 361/819; 361/833; 361/837; 439/76.2; 439/622; 439/364
[58] Field of Search .................... 361/626, 630, 361/642, 646, 729, 819, 833, 837; 439/76.2, 621, 622, 581, 364; 174/52.1

[56]           References Cited

U.S. PATENT DOCUMENTS

| 4,822,287 | 4/1989 | Blanchet ............................... 439/76.1 |
| 5,023,752 | 6/1991 | Detter et al. ............................ 361/752 |
| 5,266,047 | 11/1993 | Black et al. ............................ 439/364 |
| 5,519,586 | 5/1996 | Byrd ........................................ 439/621 |

FOREIGN PATENT DOCUMENTS

| 0 572 052-B1 | 12/1993 | European Pat. Off. ........ B60R 16/02 |
| 0 584 592-B1 | 3/1994 | European Pat. Off. ........ B60R 16/02 |
| 30 48 451 C2 | 7/1982 | Germany ........................ B60R 16/02 |
| 36 08 752-C1 | 7/1987 | Germany ........................ B60R 16/02 |
| 37 44 603 C1 | 10/1988 | Germany ........................ B60R 16/02 |
| 37 40 568-C2 | 3/1993 | Germany ........................ B60R 16/02 |
| 44 22 434-C1 | 7/1995 | Germany .......................... H05K 7/14 |

Primary Examiner—Leo P. Picard
Assistant Examiner—John B. Vigushin
Attorney, Agent, or Firm—Bradley N. Ditty

[57]             ABSTRACT

A central electrical assembly with an electrical or electronics unit is specified, which can be used in particular for motor vehicles; the central electrical assembly being of modular construction. A contact supporting body forming one module and being used to accommodate contacts or plugs with contacts which produce the connection between electrical cables and the central electrical assembly, a relay and fuse box being another module, having at least one conductor track level and plug-in slots for accommodating electrical devices, the relay and fuse box and the electrical or electronics unit being connectable with a central lifting screw to the contact supporting body in such a manner that the connections are produced between the electrical cables and the central electrical assembly, in particular the conductor track levels and the plug-in slots.

11 Claims, 12 Drawing Sheets

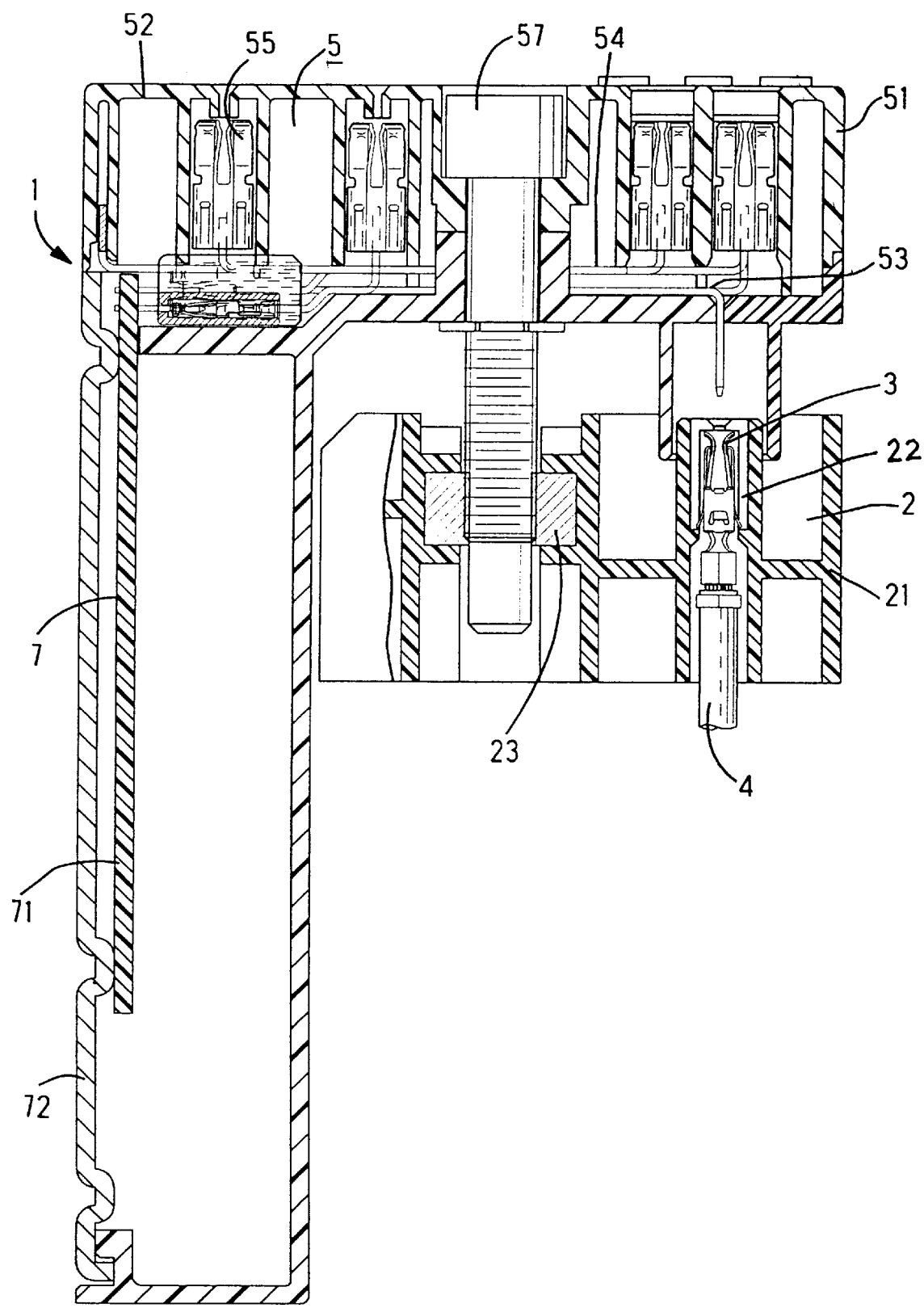

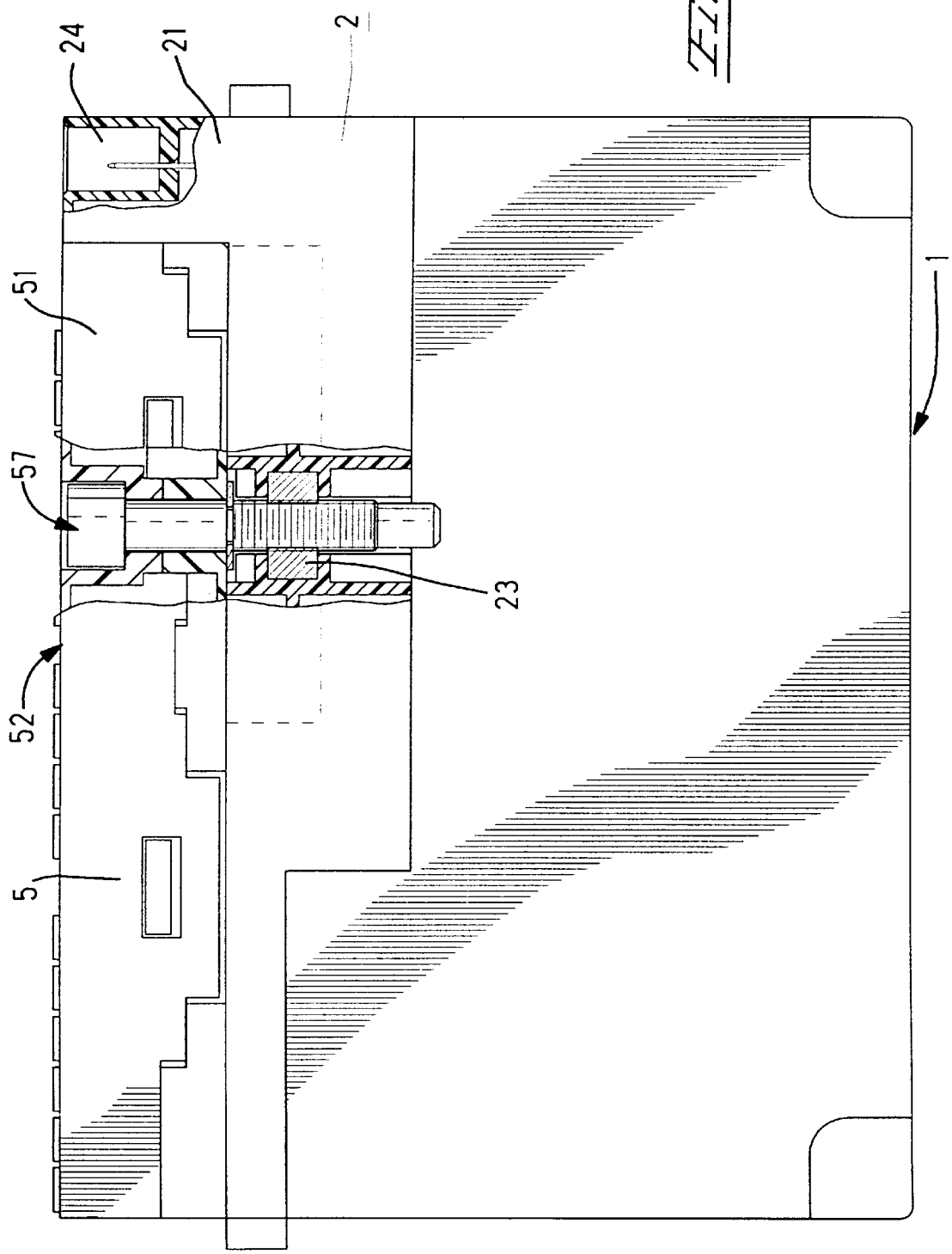

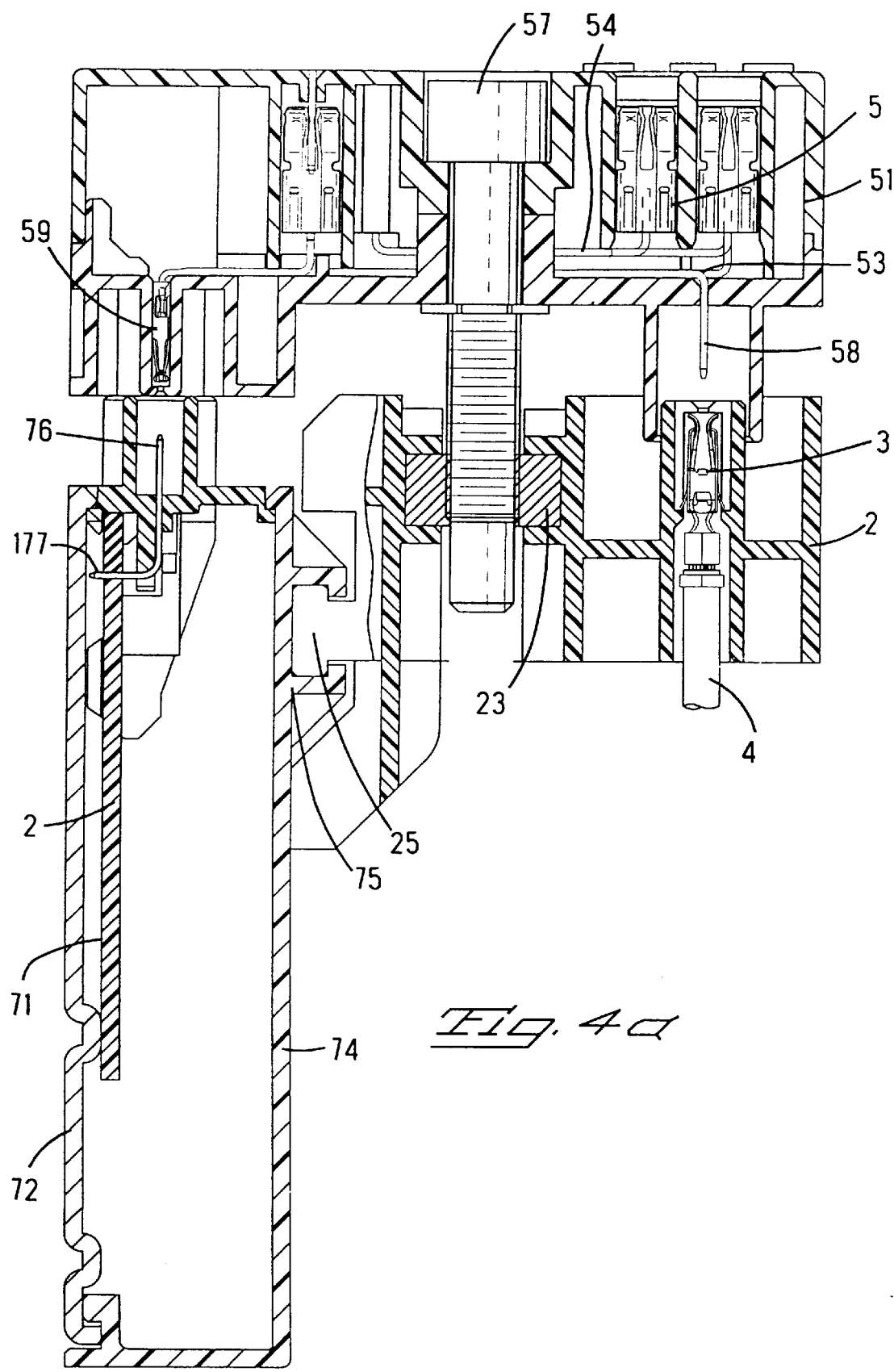

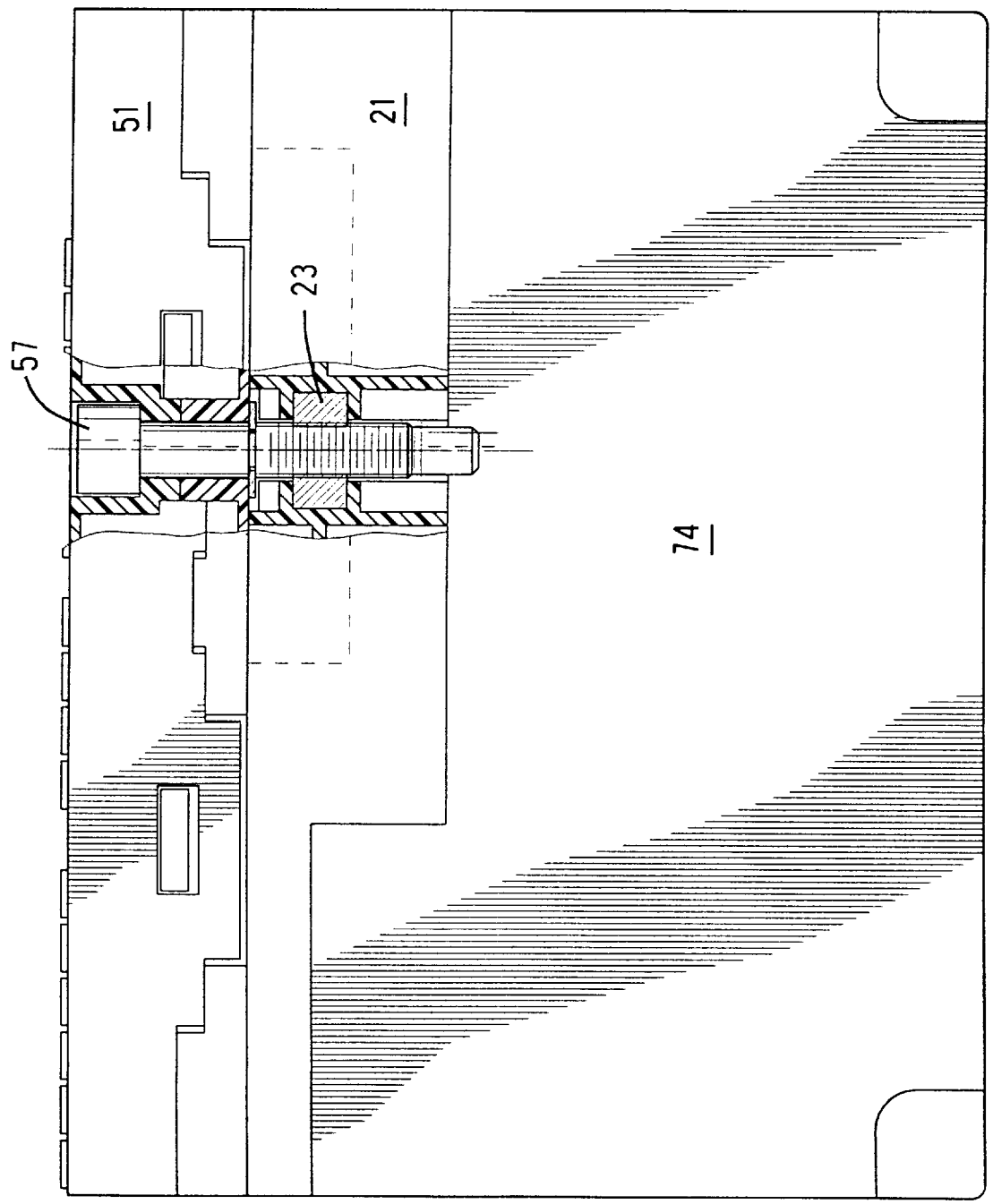

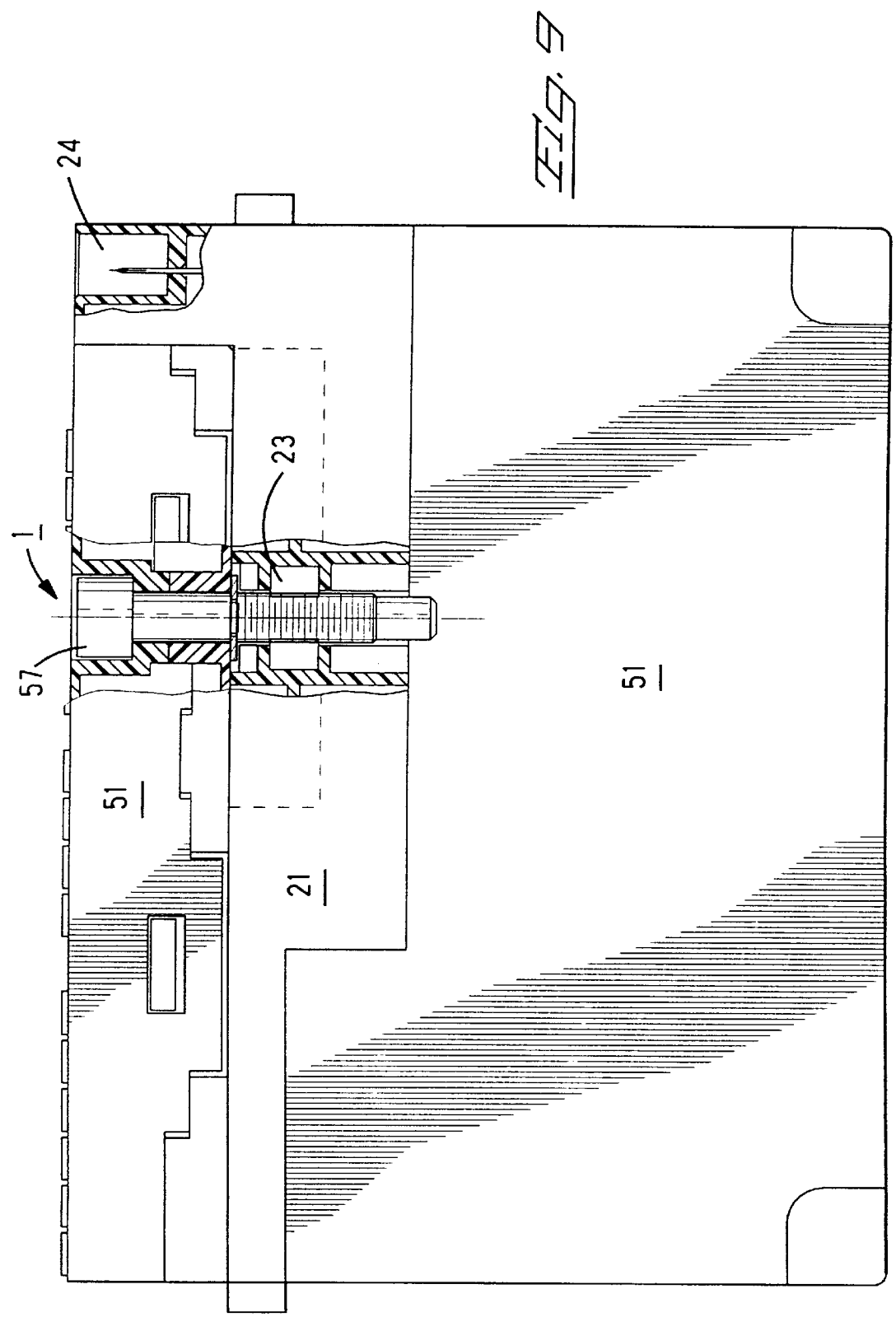

CENTRAL ELECTRICAL ASSEMBLY

BACKGROUND OF THE INVENTION

1. Field of the Invention

The invention relates to a central electrical assembly having an electrical or electronics unit, in particular for motor vehicles.

2. Description of the Prior Art

In motor vehicle electrical systems, central electrical assemblies represent the interfaces between electrical or electronic controllers and electrical cables or cable harnesses. In a corresponding manner, central electrical assemblies have connection facilities for connectors which are provided on the cable harnesses, and plug-in slots for relays and fuses. For example, for monitoring or logic links between electrical or electronic devices or elements which cooperate with one another, it is known for electrical or electronics units to be used which are arranged either externally or integrated in the central electrical assembly.

DE 44 22 434 C1 discloses a central electrical assembly having an insulating material housing, which is essentially constructed in an L shape. Located in one limb of the L are a plurality of layers of conductor track levels, from which contacts extend into the region of the cover wall of the housing in order to make contact with fuses, relays or electrical controllers. Further contacts extend from the conductor track levels into the lower side of the housing of this limb of the L, where connectors are provided for accommodating complementary connectors on the cable side. The cables are thus plugged in from the opposite side to the relays and fuses. The second limb of the L-shaped housing is formed by a housing pocket. A printed circuit board having an electronics unit can be pushed into this pocket from the side opposite the fuses and relays, that is to say from the lower side of the housing, and can be connected via corresponding connecting parts to the conductor track levels.

A precondition for use of such a central electrical assembly is thus that it is accessible both from above and from underneath. Since the space available in a motor vehicle is very constricted nowadays, this precondition cannot, in principle, always be satisfied.

DE 37 40 568 C2 discloses a central electrical assembly having an electronics unit for motor vehicles. The electronics or control unit in this case has a housing which is fitted into the actual relay and fuse box from above. A connector, which is connected to a cable harness, can be fitted into the relay and fuse box from underneath.

Thus, in this case as well, the relay and fuse box must be accessible both from above and from underneath. It is also necessary for the cables to have a certain excess length in order that they can first be inserted into the box, and the box can then be mounted in the vehicle.

SUMMARY OF THE INVENTION

The object of the invention is to specify a central electrical assembly for motor vehicles, in which the excess length for the cables can be optimized.

The object is achieved by a central electrical assembly having an electrical or electronics unit with the following features:

the central electrical assembly being of modular construction, a contact supporting body forming one module, the contact supporting body being used to accommodate contacts or plugs with contacts which produce the connection between electrical cables and the central electrical assembly, a relay and fuse box being provided, having at least one conductor track level and plug-in slots for accommodating electrical devices, the relay and fuse box and the electrical or electronics unit being connectable to the contact supporting body in such a manner that the connections are produced between the electrical cables and the central electrical assembly, in particular the conductor track levels and the plug-in slots.

It is an advantage that a central electrical assembly of modular construction is specified, in which cable harness connectors can be mounted in a contact supporting body. This can be done even before the cable harness is fitted in the vehicle.

In addition, another advantage is that the number of connectors and contact points, as well as the range of contacts, can be reduced. This can be done, for example, by combining the connectors which connect cables which are routed to the same unit in the motor vehicle. This allows the use of an optimized cable harness to be achieved. The cost for installation and testing of the cable harness is reduced and the risk of partial connection is also reduced. The excess cable lengths required are shorter, and this leads to a weight saving. A considerable cost reduction can be achieved.

It is a further advantage that repairable parts are easily replaceable (fuses, relays, printed circuit boards).

It is still further an advantage that the central electrical assembly is of modular construction and has housings made of an insulating material.

It is a feature of one version that a housing for the relay and fuse box and the electronics unit is provided, which is designed essentially in an L shape. A printed circuit board with the electronics unit is located in one side of the L-shaped housing, and conductor track levels, for example in the form of stamped grids, are located in the other side. This separation allows optimized technologies to be used specifically. The relay and fuse box thus has an integrated electrical or electronics unit. The conductor track levels are predominantly implemented using busbars, with holders for relays and fuses. They are designed for relatively high currents, for example I>10A. The electronics unit is used for signal processing, has sequential functions and is used to drive the loads. If the printed circuit board carries heavy currents, the load can be reduced by fitting the electrical connections directly in the region of the power stage.

It is another feature that the relay and fuse box can be connected to the contact supporting body by means of a single device. A lifting screw and a corresponding nut are provided, for example, in these two parts for this purpose. The screw connection mechanically connects the two parts to one another and protects them against vibration. The contact forces are also coped with the aid of the screw. Contact between the contacts which are provided in the contact supporting body on the conductor track levels is made while the two described parts are being joined together. This joining operation is most advantageously carried out in the cable receptacle.

In a second version of the central electrical assembly according to the invention, the assembly comprises different modules: a contact supporting body, a relay and fuse box and an electrical and electronics unit. Each module has a housing and the housings can be connected to one another in such a manner that corresponding electrical connections are made between the contacts arranged in the housings. For example, the housing of the electrical and electronics unit can in this case be connected to the contact supporting body via a dovetail guide. These two modules, which are connected to one another, can then be mounted in the equipment box of a motor vehicle. The relay and fuse box module is then just fitted from above onto the two modules, which are already connected to one another. This can be done, for example, by means of a central lifting screw, which enters the contact supporting body and, when turned, correspondingly pulls the relay and fuse box module downwards and allows contact to be made. For example, pin receptacles can be provided in the electrical and electronics unit module, which allow contact to be made subsequently with the wiper and engine compartment contacts from above without having to move the entire central electrical assembly again. The wiring can be routed upwards out of the equipment box without being diverted, and is completely independent of the internal cable routing.

BRIEF DESCRIPTION OF THE DRAWINGS

FIG. 1a shows a cross section through a first version of a central electrical assembly in the unassembled state;

FIG. 3 shows view with partial cross sections of this first version of the central electrical assembly;

FIG. 4a shows a cross section through a second version of a central electrical assembly in the unassembled state.

FIG. 6 shows a side view with partial cross sections of this second version of the central electrical assembly;

FIG. 9 shows a side view with partial cross sections of this third exemplary embodiment of the central electrical assembly.

DETAILED DESCRIPTION OF THE PREFERRED EMBODIMENT

Figure 1B:
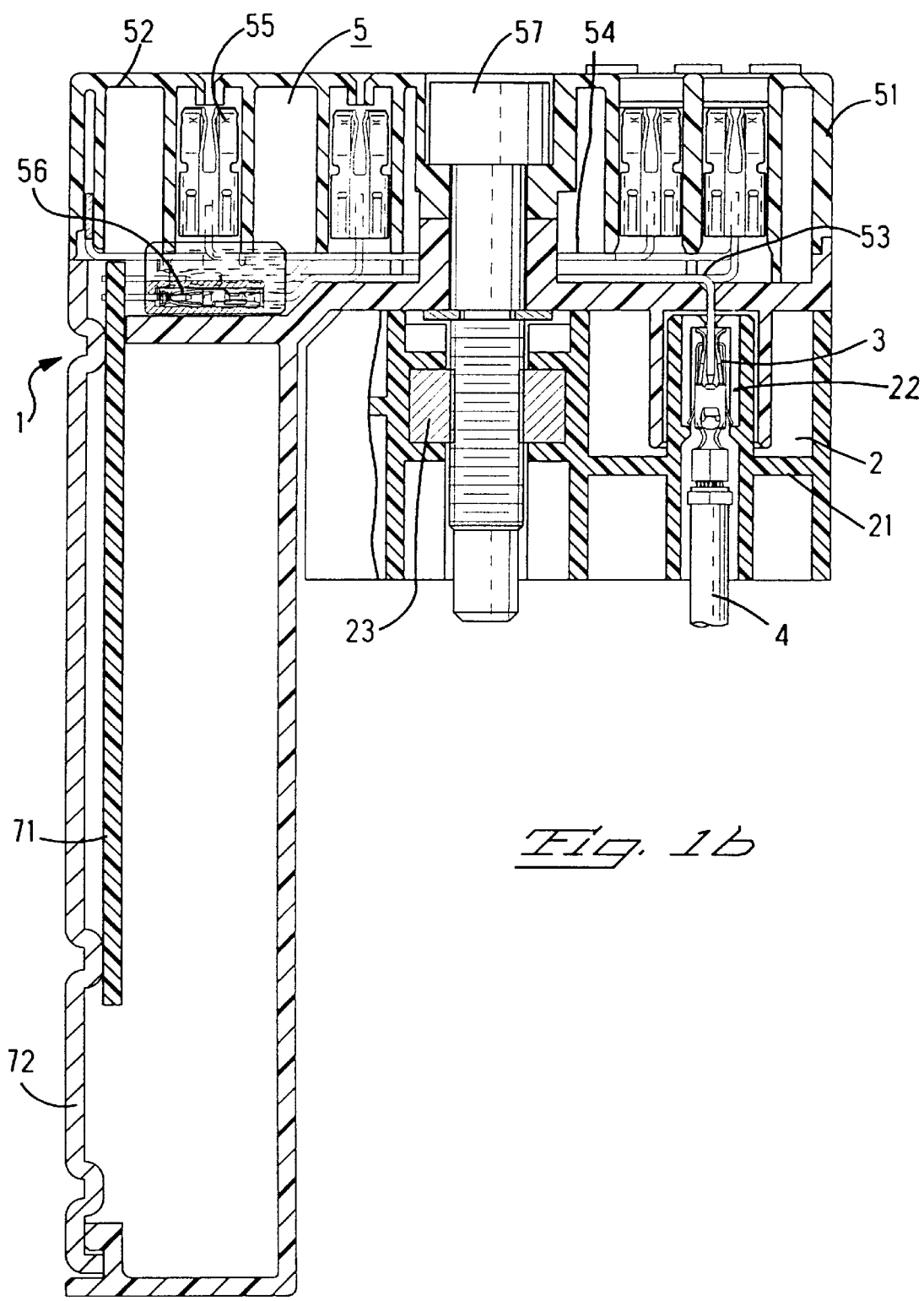
FIG. 1b a corresponding cross section in the assembled State.

A first version of a central electrical assembly 1 according to the invention, for motor vehicles, is illustrated in FIGS. 1a, 1b, 2 and 3. The central electrical assembly 1 is in this case formed by two modules. The first module is the contact supporting body 2. This contact supporting body has a housing 21. In addition, the contact supporting body 2 has receptacle chambers 22 for accommodating electrical contacts 3. The contacts 3 are connected to electrical cables 4 which, in turn, are connected to elements or electronic or electrical devices. It is also possible for the contact supporting body 2 to have openings into which connectors can be fitted which have contacts which are connected to electrical cables. The contact supporting body 2 is essentially used for accommodating contacts which are required to produce electrical connections to the central electrical assembly. The contact supporting body 2 may be fitted in a vehicle as a prefabricated unit with the cables and contacts inserted therein. This makes it unnecessary to have any excess cable length on the contact supporting body. The contact supporting body 2 is then fitted in the equipment box of a motor vehicle.

A further module of the central electrical assembly 1 is formed by a relay and fuse box 5. This has a housing 51 which is constructed essentially in an L shape from two limbs. At least one conductor track level 53 is located in the first limb, parallel to a cover wall 52. In the case of complicated structures, it is expedient to provide two conductor track levels 53, 54, arranged parallel and at a distance from one another. The conductor track levels are generally designed as stamped grids. They have regions which are bent out of the levels, are on the one hand used to make contact with the contacts 3 and, on the other hand, are themselves fitted with cruciform contacts 55 for making contact with relays or fuses. Other suitable contacts can also be used, of course, instead of cruciform contacts. Plug-in slots for accommodating electrical devices, in particular fuses, relays or electrical controllers, are arranged in the cover wall 52 and are connected to the conductor track levels 53, 54. Plug-in slots for fuses are marked by an S, and plug-in slots for relays by an R, in FIG. 2.

The second limb of the housing 51 extends on the side facing away from the cover wall 52 and has a printed circuit board 71 arranged in it, at right angles to the conductor track levels 53, 54. The printed circuit board 71 is fitted with the electrical or electronics unit 7. This is a power and control electronics unit which, for example, controls the windshield wipers, the lamps, and the turn indicators etc. Low-power relays can also be provided on this printed circuit board 71. This can be done, for example, for the turn-indicator system. It is then no longer necessary for the turn-indicator system to be connected to the relay and fuse box 5. The turn-indicator system can, for example, be connected directly to the electronics or electrical unit 7, via a connection 24 provided on the contact supporting body 2, as can be seen particularly well in FIGS. 2 and 3. As can be seen from FIG.s 1a and 1b, the second limb has a cover 72, which is designed to be removable and via which the printed circuit board 71 can be fitted in the second limb. Soldered-in pins are provided at one end on the printed circuit board and engage in the connecting element 56 in order to make contact with the conductor track levels 53, 54.

Figure 2:
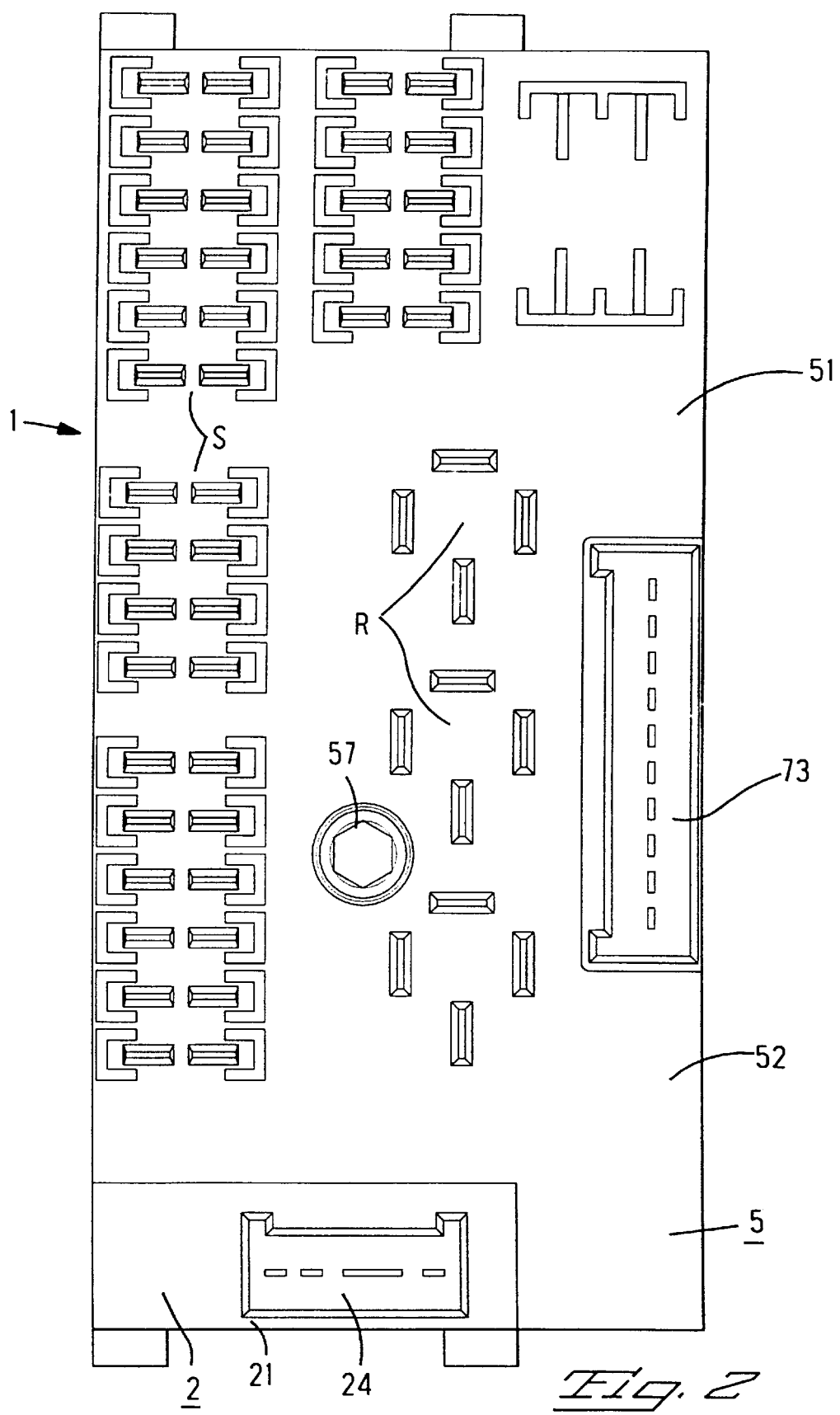
FIG. 2 shows a view of the central electrical assembly from the connector face side.
Figure 4B:
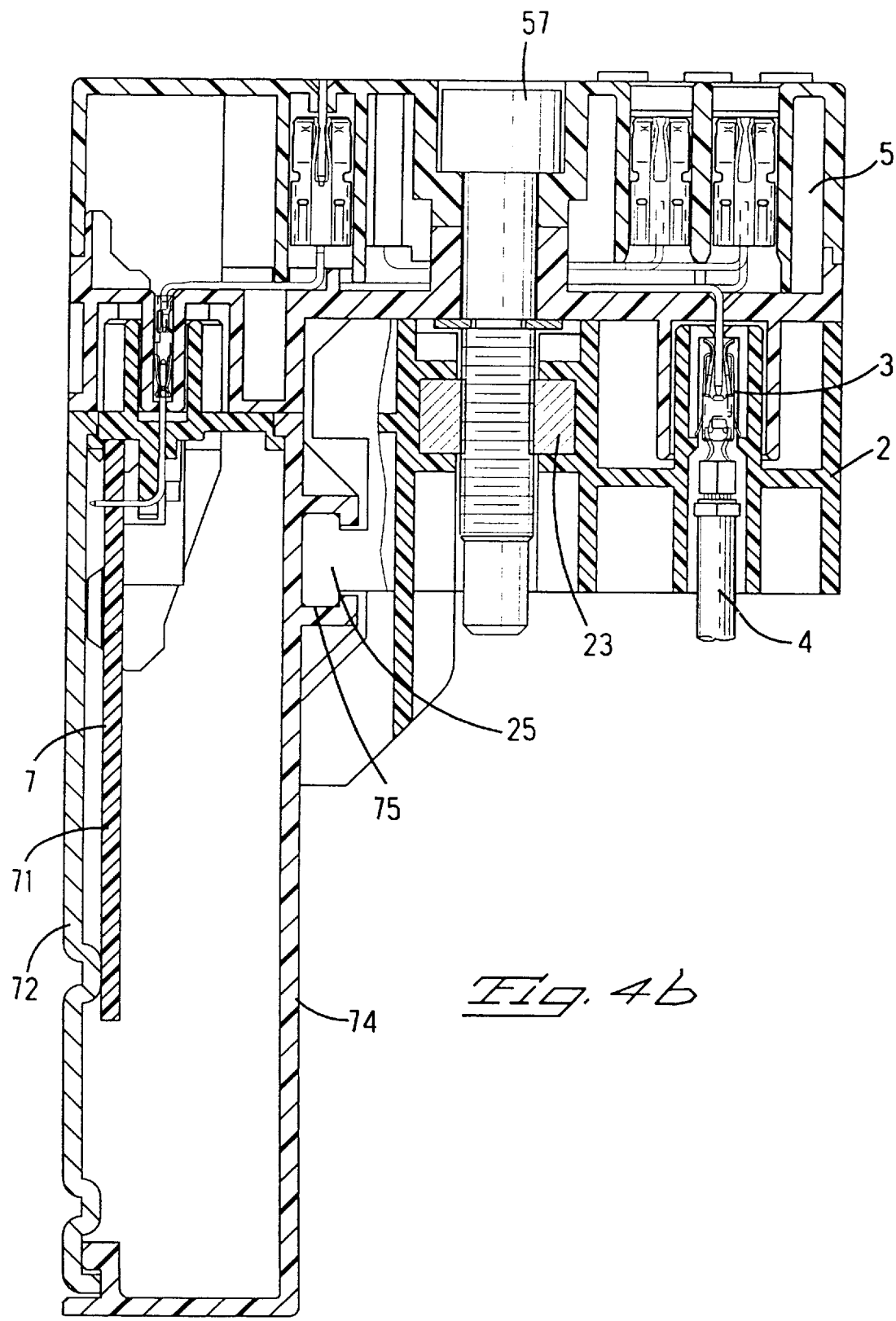
FIG. 4b shows a corresponding cross section in the assembled state.
Figure 5:
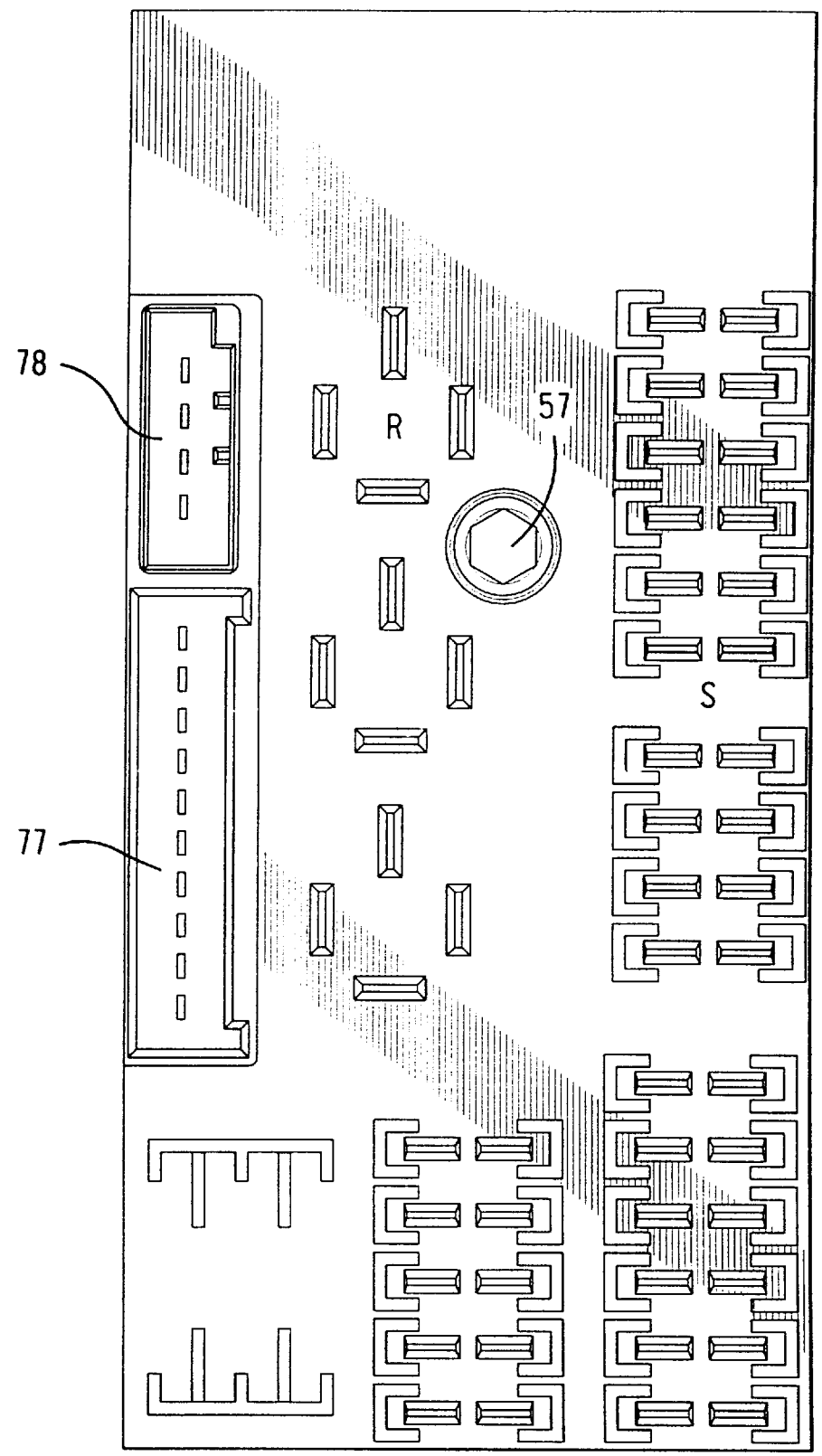
FIG. 5 shows a view of the central electrical assembly from the connector face side.
Figure 7A:
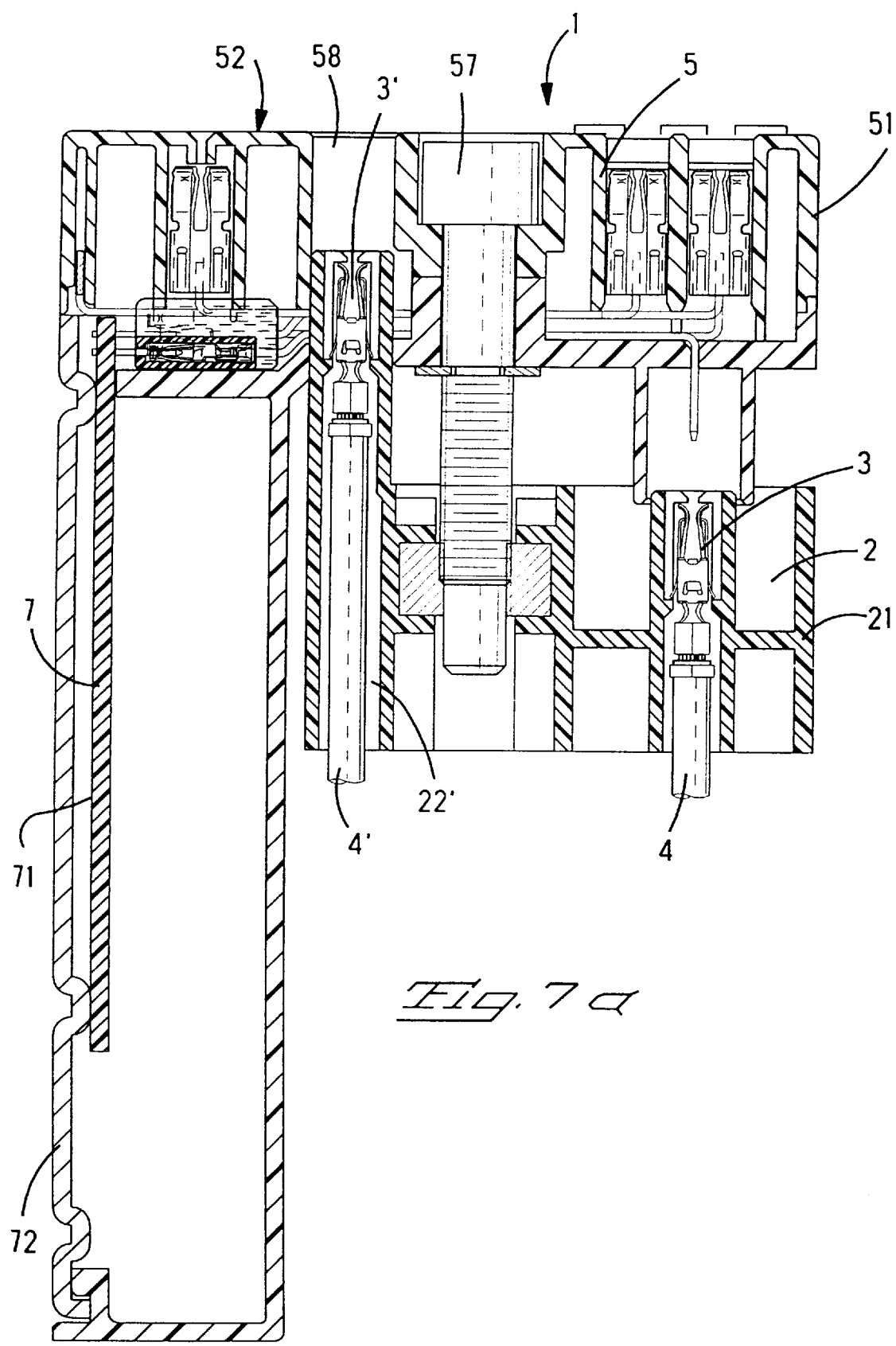
FIG. 7a shows a cross section through a third exemplary embodiment of a central electrical assembly in the unassembled state.
Figure 7B:
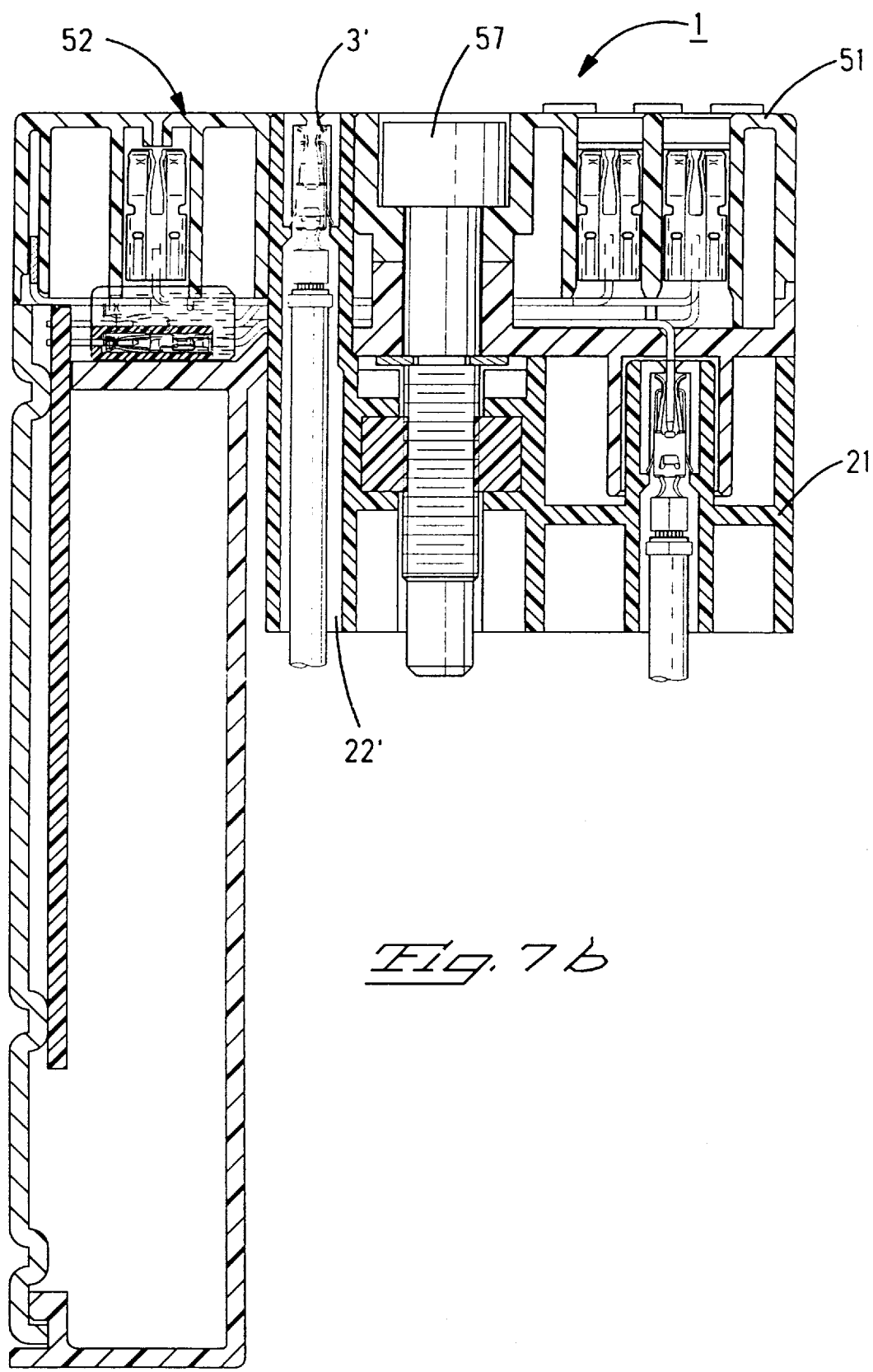
FIG. 7b shows a corresponding cross section in the assembled state.
Figure 8:
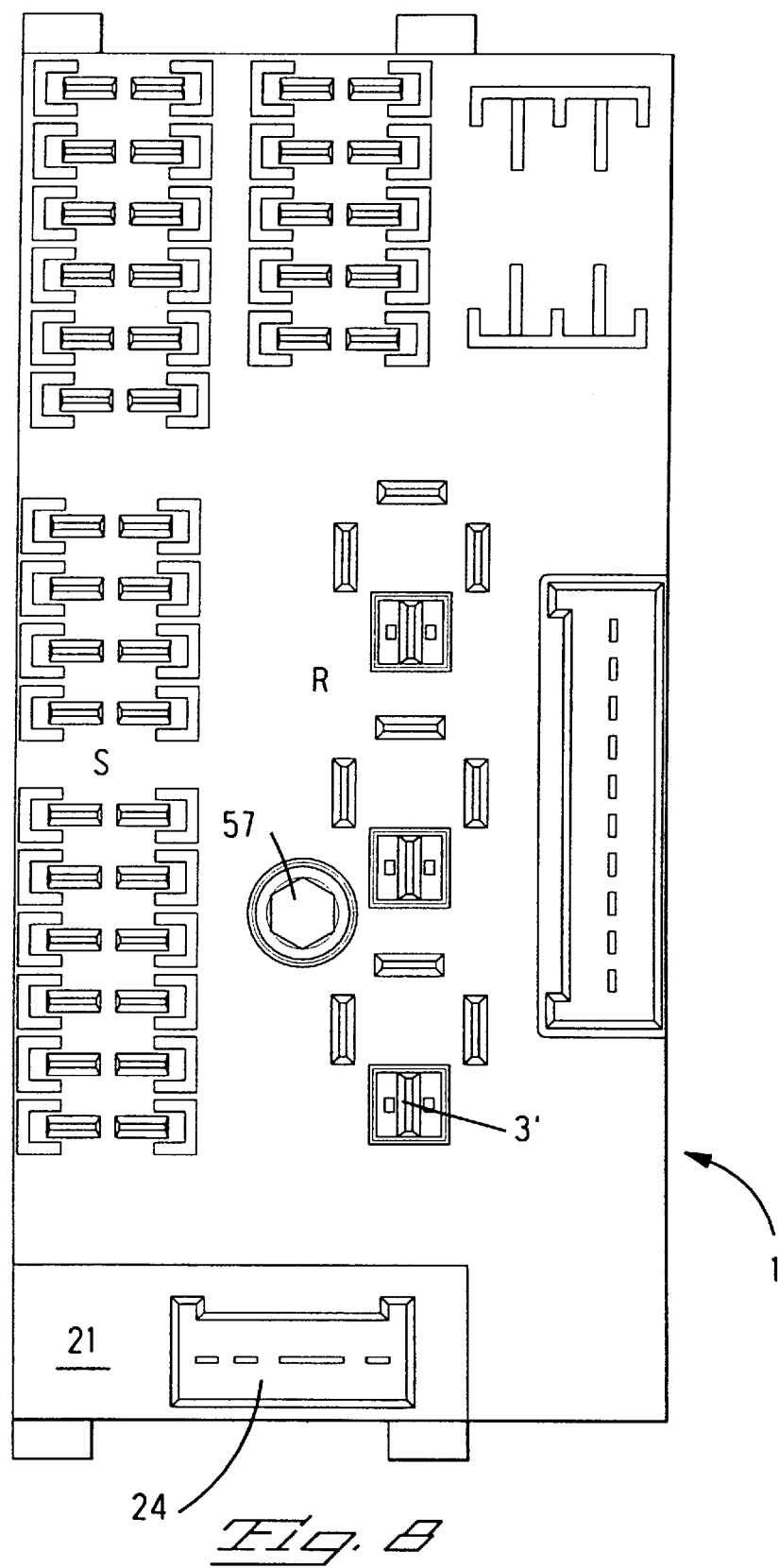
FIG. 8 shows a view of the central electrical assembly from the connector face side.

It is possible, as illustrated in FIG. 2, for one connector half 73 to be provided on the printed circuit board, allowing some of the wiring to be fitted directly on the electrical or electronics unit. The connector half 73 is accommodated in a cutout in the cover wall 52.

The two housings 21, 51 of the contact supporting body 2 and the relay and fuse box 5, for example the electrical or electronics unit 7, are connected to one another. A nut 23 is provided in the housing 21, and the housing 51 has a corresponding central lifting screw 57. Operating this screw results in the two housings 21 and 51 being connected to one another, and in the corresponding plug-in contacts being mated.

FIGS. 4a, 4b, 5 and 6 illustrate a second exemplary embodiment of a central electrical assembly according to the invention. The same reference characters have been used as in the first exemplary embodiment, for the same parts. With respect to the figures, it is intended to mention in particular the differences from FIGS. 1a, 1b, 2 and 3. A contact supporting body 2 is provided which essentially corresponds to that in the earlier figures. Guide means 25 are provided on the contact supporting body 2. These guide means 25 interact with complementary guide means 75 on the housing 74 of an electrical or electronics unit 71. The electrical or electronics unit essentially has one printed circuit board 71, which is fitted in the housing 74. The housing 74 has a cover on the side 72, through which the printed circuit board can be replaced. The printed circuit board is connected to pins 177 which end in a pin receptacle 76 which is arranged on a side of the housing 74 pointing upward. The two mutually connected modules, the contact supporting body 2 and the electrical or electronics unit 7, can be mounted in the vehicle in this mutually connected state. The contacts are in this case already located in the contact supporting body 2, and are connected to corresponding cables. A third module can now be fitted to these two mutually connected modules, this third module comprising the actual relay and fuse box 5. Corresponding conductor track levels 53, 54 are provided in it and make contact not only with the contacts 3 in the contact supporting body 2 but also with the pins 177 in the pin receptacle 76, via pins 58 or contacts 59. The modules are connected to one another by means of a nut 23, which is fitted in the housing 21 of the contact supporting body 2, and a corresponding central lifting screw 57 in the housing 51 of the relay and fuse box 5. In the present exemplary embodiment, the electrical or electronics unit is fitted with two connector halves 77 and 78, 78 for the wiper contact and 77 for the engine compartment contact. Both connector halves are designed as pin receptacles.

This exemplary embodiment of the invention is particularly advantageous, since it provides mechanical separation between the electrical or electronics unit and the relay and fuse box. While the electronics unit can already be pre-installed in the equipment box, the modules are joined together by the lifting screw.

A third exemplary embodiment of a central electrical assembly according to the invention will be described with reference to FIGS. 7a, 7b, 8 and 9. The third exemplary embodiment is very similar to the first exemplary embodiment. A housing 51 is provided, which is constructed in an L shape and accommodates the electrical or electronics unit 7 in the vertical part. This electrical or electronics unit 7 is mounted on a printed circuit board 71. The printed circuit board is connected to the cover 72 which is composed, for example, of aluminum and is used for heat dissipation. The special feature of this exemplary embodiment is that the contact supporting body 2 not only has contacts 3 which are connected to cables 4, but has further contacts 3' which are connected to cables 4'. These contacts are likewise located in receptacle chambers 22', but these do not project beyond the surface of the housing 21. A through-opening 58 is provided in the housing 51 for th e relay and fuse box 5. This through-opening 58 extends into the cover wall 52. When the housings 51 and 21 are joined together, the contact 3', with the housing part of the housing 21 and the receptacle chamber 22', engages in the through-opening 58, and passes 25 through the housing 51. As can easily be seen in FIG. 8, the connector faces of the relays are formed by three contacts of the relay and fuse box 5 and by a contact 3', which is accommodated in the contact supporting body 2. This solution simplifies the conductor track levels and allows direct access to the relays.

We claim:

1. A modular central electrical assembly for motor vehicles comprising:

a contact supporting body forming one module, the contact supporting body being used to accommodate contacts or plugs with contacts which produce the connection between electrical cables and the central electrical assembly;

a relay and fuse box module having at least one conductor track level contained in a housing having plug-in slots for accommodating electrical devices and a mating side opposite thereto;

the relay and fuse box being connectable to the contact supporting body at the mating face in such a manner that the connections are produced between the electrical cables and the central electrical assembly, in particular the conductor track levels and the plug-in slots, as a result of the modules being connected.

2. The central electrical assembly as claimed in claim 1, wherein in each case one single complementary means is provided in the contact supporting body and on the relay and fuse box, in such a manner that the two parts can be connected to one another by these means.

3. The central electrical assembly as claimed in claim 2, wherein both complementary means comprise a central lifting screw and a nut.

4. The central electrical assembly as claimed in claim 3, wherein the relay and fuse box includes a second module with an integrated electrical or electronics unit.

5. The central electrical assembly as claimed in claim 1, wherein the relay and fuse box has a housing which is constructed essentially in an L shape from two limbs, wherein at least one conductor track level is located in one limb parallel to a cover wall, wherein plug-in slots for accommodating electrical devices, in particular fuses, relays or electrical controllers, are arranged in the cover wall, and wherein a printed circuit board is arranged in the second limb, which extends on the side facing away from the cover wall, which printed circuit board is fitted with the electrical or electronics unit and is connected to the conductor track levels.

6. The central electrical assembly as claimed in claim 5, wherein the printed circuit board can be fitted into the corresponding limb at the side.

7. The central electrical assembly as claimed in claim 1, wherein the contact supporting body forms a first module, the relay and fuse box forms a second module and the electrical and electronics unit forms a third module, wherein each module has a housing and wherein the housings can be connected to one another in such a manner that corresponding electrical connections are made between the contacts arranged in the housings.

8. The central electrical assembly as claimed in claim 7, wherein the contact supporting body has a connection via which a connection can be produced through the contact supporting body to the electrical or electronics unit.

9. The central electrical assembly according to claim 1, wherein the electrical or electronics unit has a connector half by means of which said unit can be connected directly to the corresponding elements.

10. The central electrical assembly as claimed in claim 1, wherein the plug-in slots for accommodating electrical devices, in particular fuses, relays or electrical controllers, are partially formed by the relay and fuse box and partially by the contact supporting body.

11. The central electrical assembly as claimed in claim 7, wherein the housings of the contact supporting body and the electrical and electronics unit have complementary means for attaching the modules to one another, in particular a dovetail guide.

* * * * *